Patented June 17, 1941

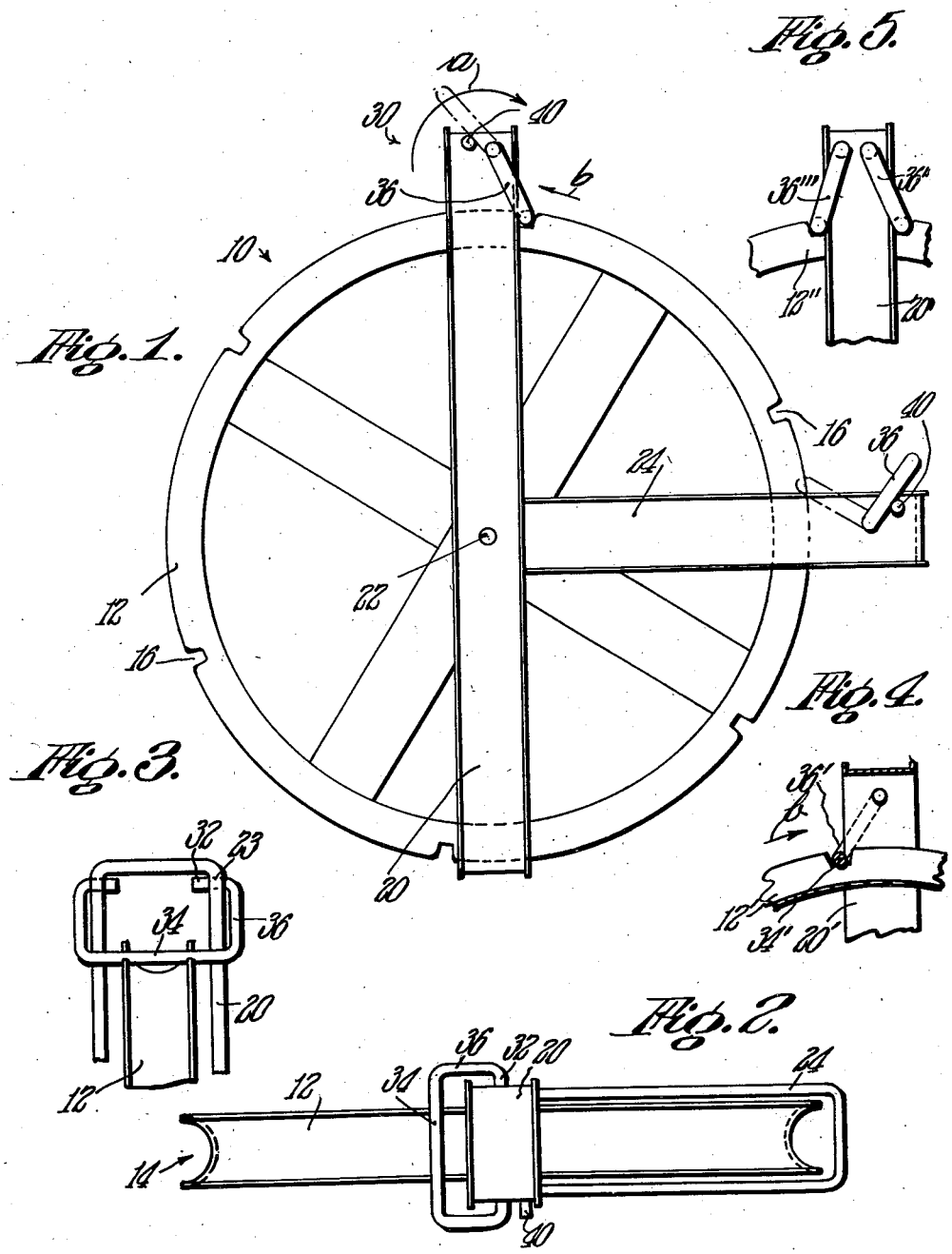

2,245,863

UNITED STATES PATENT OFFICE 2,245,863

PULLEY CONSTRUCTION

Theodore Labonte, Holyoke, and William Labonte, Chicopee Falls, Mass.

Application April 29, 1940, Serial No. 332,186

2 Claims. (Cl. 188—69)

Our invention relates to improvements in a pulley construction and the principal object of the invention is directed to the provision of an improved means for preventing reverse movements in pulley lines such as are commonly used in conjunction with clotheslines and the like.

The chief intended use of the device of our invention is as a safety appliance for a pulley where, in its use, such a safety means is necessary in order to prevent the pulley from rotating relative to its support when such rotative movements are not desired.

It is an object of the device of our invention to provide a novel and improved construction of the type in which cumbersome gears and teeth are eliminated. Pulleys heretofore known all have the common objection that in order to operate them, complicated mechanisms are required. This adds increasingly to the production costs thereof and accordingly we have devised a novel means whereby such difficulties are overcome. We accomplish this by the provision of a device which entirely obviates the need for such parts.

Other prime objects of our invention include first, the provision of a simplified construction of a pulley device; second, the securement of a high degree of accuracy in the character of the work performed therewith than has heretofore been possible; third, the attainment of a higher speed in the construction of the device due to its simplification in construction and its unique composition of parts; fourth, the attainment of a flexibility or a capability of easy and rapid adjustment and repair by which a large variety of work can be produced on the same device; fifth, the achievement of greater ease in adjustment and repairs, and sixth, the provision for an improved pulley which can be made more economically and with fewer operations in the manufacture of its parts, as well as in the assembly thereof, than prior devices known in the art.

With the foregoing and various other novel features and advantages and other objects of our invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing, wherein:

Fig. 1 is a side elevational view of the device of our invention;

Fig. 2 is a top plan view of the device shown in Fig. 1;

Fig. 3 is a partial and elevational view of the device of our invention;

Fig. 4 is a sectional elevational view through the upper portion of the bracket member and adjacent portion of the wheel to explain a modification of certain features of the invention; and Fig. 5 is a partial side elevational view of a modified form of the device of our invention.

Referring now to the drawing more in detail, wherein similar reference figures refer to like parts, and referring more particularly to the preferred form of our invention which has been selected for illustrative purposes, we have shown a wheel which is generally indicated by the character 10 having side arms 12 which provide a channel 14 in which a rope or chain or other similar means may be carried. Each of the side arms 12 contain notches 16 which are spaced along the peripheral edge of the pulley as is best shown in Fig. 1.

The wheel 10 is surrounded and supported by a bracket-like member 20 which in the form shown consists of a frame-like part extending around the wheel on either of its sides as well as at its top and bottom. A pin or shaft 22 extends from opposite sides of the supporting member 20 and carries the wheel 10 at its center so that the wheel is rotatable relative thereto.

If it is desired, a secondary supporting member 24 may extend outwardly from the supporting member 20 at an angle relative thereto as is shown in Fig. 1, and for purposes hereinafter to be more fully described. In the form as shown, the supporting member extends perpendicularly relative to the axis of the member 20 and in one direction therefrom, although it will be understood that the member 24, if so desired, could extend outwardly in either or both or any direction from the supporting member 20 so as to assist in the provision of a ratchet and pawl means as will hereinafter be more fully explained.

At one extremity of the supporting member 20, there is a hook means consisting of a rod-like member 30 which is secured at either of its end portions 32 to the supporting member 20 as is shown in Fig. 3. An intermediate portion 34 of the member 30 is off-set relative to the end portions 32 so as to provide arms 36 therebetween. In the form shown, the ends 32 are bent inwardly so as to engage the supporting member 20 from the outside by means of the insertion of the ends 32 through openings 23 in the supporting member 20.

On the other side of the supporting member, opposite from the side in which the hook means is engaged, there is provided a stop means consisting of a pin 40 which is adapted to receive the hook means as it is swung upwardly from its downwardly depending position when the same is not in use. The hook means is thus pivotally arranged relative to the supporting member 20 and is adapted to be swung in an arc as represented by the arrow a so as to abut the wheel 10 on one side of the supporting member 20 as is shown in Fig. 1 and to abut the pin 40 at the other extremity of its arc where it is in a non-engaging position upon the supporting member.

Preferably the pivotal arrangement on the supporting means is disposed upon one side of the supporting means rather than in the center thereof so that the hook means is adapted to depend downwardly in more of a vertical position than would be possible were the pivot centered in the supporting means. This is best shown in the view in Fig. 1.

Another pin 30 having arms 36 is supported on the extremity of the member 24 and is swingable in an arc between a position where it abuts the pin 40 and a position where it engages the wheel 10 as will be hereinafter more fully explained.

As the wheel 10 rotates, the notches 16 on the arms 12 of the wheel are brought into engagement with the hook means 30 and the hook's intermediate portion 34 is adapted to slip into the notches 16, whereby the wheel is held against rotation in the direction of the arrow b as seen in Fig. 1.

A second locking means may be disposed on the horizontal shank or support 24 and this means acts in the same way, only in an opposite direction so as to keep the wheel from running in either direction if it is so desired. Lock means when thus provided on both shanks or supports are so constructed that they can be flipped out of the way with a flick of the finger. When desiring to lock the line at a certain point so as to keep it from slipping or otherwise moving both lock means may be thus engaged and the pulley is locked against movements in either direction.

The notches 16, which are preferably U-shaped, may be equally spaced around the pulley, with the intermediate portions 34 of the members 30 being receivable therein as the wheel is rotated upon its axis to the proper position. The clothesline can be fed out as needed with no danger of recoil in the wheel as the locking means engages in the notches. By this means, the line cannot roll back so as to jam the fingers or any clothing in the pulley which is a distinct advantage when the line is loaded.

As a modification of the device of our invention, the locking means as shown in Fig. 4 may be such in all cases that the arms 36' thereof may be short enough and the parts so arranged as to permit the wheel to recoil rearwardly to the extent that the intermediate portion 34' of the locking means abuts the supporting members 20' as it rests in the notches of the side arms 12'. That is to say, the thrust is not so much upon the supporting member at the points where the end portions of the hook means pivot in the supporting member as in the case of the primary form of our invention, but the thrust is upon the side edges of the supporting member 20' against which the part 34' of the locking member abuts.

As a further modification of the device of our invention, in Fig. 4 we have shown a hook means which can be used upon either side of the supporting member 20' merely by rotating the same upon its pivot. No stop means, such as a pin as is shown in Fig. 1, is employed so as to limit the length of the arc of the movement of the hook means. Accordingly the hook can be used on either side of the supporting member all as may be desired.

As a still further modification of our invention, in Fig. 5 we have shown a pair of hook members having arms 36" and 36'" which may be employed together and at one time so as to insure against movements in either directions according to the particular desires or the needs of the operator. The arrangement is such that one swings relative to and at each side of the member 20" and in this way there is available a member for engaging in the notches in the side arms 12" of the wheel regardless of the direction in which the wheel is rotating.

Manifestly the specific details of construction may be considerably varied from those herein shown and described without involving any departure from the principle of the invention or sacrificing any of the advantages inherent therein. While I have described my invention in this specification in great detail and particularly with respect to the present preferred form thereof, it is not desired to be limited thereto since many changes and modifications may be made therein without departing from the spirit and scope of the invention.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A pulley construction comprising in combination, a frame having spaced side members, a wheel between said side members journalled for rotation relative thereto and having spaced side flanges to provide a circumferential rope-groove therebetween, said flanges being provided with a pair of aligned notches extending inwardly from the peripheries thereof and terminating at a distance from the bottom of said rope-groove, and a lock member pivoted to said frame for swinging movements between locking and non-locking positions and having a transverse part which is engageable in said notches when the lock member is in locking position, said lock and side members being so located that when the wheel is rotated in a certain direction said transverse part swings into engagement with the sides of said notches and is urged thereby into abutting engagement with the adjacent edges of said side members and cooperates therewith to hold said wheel against rotation in said certain direction and when the wheel is rotated in an opposite direction said transverse part is released from engagement in said notches and with said edges of the side members.

2. A pulley construction comprising in combination, a frame having spaced side members, a wheel between said side members journalled for rotation relative thereto and having spaced side flanges to provide a circumferential rope-groove therebetween, said flanges being provided with a plurality of spaced pairs of aligned notches which extend inwardly from the peripheries thereof and terminate at a distance from the bottom of said rope-groove, and a pair of lock members independently pivoted to said frame at spaced points thereof for swinging movements between locking and non-locking positions, each of said lock members having a transverse part which is engageable with the sides of one pair of said notches when that particular lock member is in between locking and non-locking positions, each of said lock members having a transverse part which is engageable with the sides of one pair of said notches when the said lock member is in locking position, said lock and side members being so located that when the wheel is rotated in a certain direction one of said transverse parts swings into engagement with the sides of one of said pair of notches and is urged thereby into abutting engagement with the adjacent edges of said side members and co-operates therewith to hold said wheel against rotation in said certain direction and when the wheel is rotated in an opposite direction said transverse part is released from engagement in said notches and with said edges of the side members.

THEODORE LABONTE.
WILLIAM LABONTE.